Patented May 16, 1933

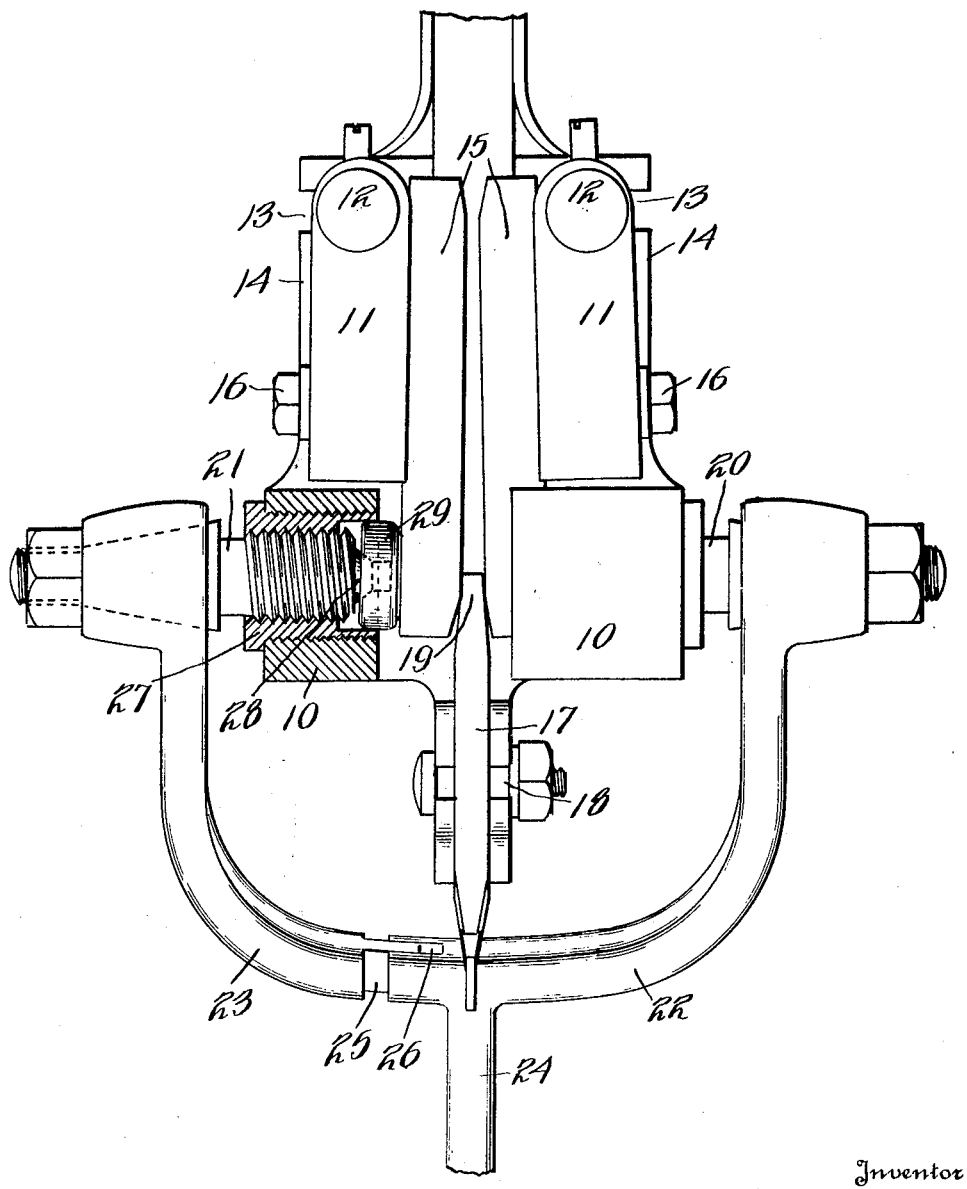

1,909,268

UNITED STATES PATENT OFFICE

DEWEY E. GOMMEL, OF INDIANAPOLIS, INDIANA, ASSIGNOR TO E. C. ATKINS & COMPANY, OF INDIANAPOLIS, INDIANA, A CORPORATION OF INDIANA

SAW TOOTH SHAPER

Application filed April 17, 1930. Serial No. 445,145.

This invention relates to saw tooth shapers and is an improvement over the swage tooth shaper shown in Patent No. 1,680,256, granted to J. F. Pribnow, August 7, 1928.

In shapers of the kind heretofore made the body of the shaper was made of steel which made the shaping tool as a whole very heavy.

An object of the improvement set forth in this application is to provide a shaping tool which will be much lighter than those heretofore in use and yet maintain all of the strength and rigidity of the former tools.

A further object is to provide improved bearings whereby friction will be eliminated to greater extent than in shapers now known.

Referring to the accompanying drawing which is made a part hereof and on which similar numerals indicate similar parts, The single figure is a plan view of a portion of a shaper showing my invention applied thereto.

In the drawing numeral 10 indicates the body portion of a shaper such as that shown in the patent to Pribnow above referred to. Mounted on this body are jaw carrying blocks 11, these blocks being pivoted on bolts 12 which extend through slots 13 in a flanged portion 14 of the body 10. Shaper jaws 15 are secured to the jaw carriers by means of bolts 16. As in the patent referred to a tooth stop bar 17 is secured to a bracket by means of a bolt 18 and has its end 19 positioned between the forward ends of the shaper jaws 15. Screws 20 and 21 operated by arms 22 and 23 provide for swinging the jaws 15 on their pivots 12 to shape the saw teeth. The arm 22 has an operating handle 24. The arm 23 has a tongue 25 which slides into a slot 26 in the arm 22 to permit the arm 23 to slide toward and from the arm 22 as the screws 21 and 22 are moved in or outward toward and from the shaper jaws.

As shown in section at the left of the figures, the screws 20 and 21 are threaded through sleeves 27, one of which alone is shown. These sleeves are screw threaded into threaded sockets in the holder block 10. The end of the screws 20 and 21 are cone or ball-shaped, as shown at 28, and seat within a corresponding socket in a thrust bearing 29. This thrust bearing is preferably a ball bearing of well-known construction which rests against the side of the shaper jaws 15. By reason of the ball and socket connection between the end of the screw 21 and the bearing 29, the bearing may be alined itself so as to firmly seat against the side of the shaper jaw 15. By providing a ball thrust bearing friction is eliminated to a great extent so that the lever 24 may be easily operated. The block 10 and preferably the arms 22, 23 and handle 24, as well as certain other parts are preferably made of aluminum so that they are very light in weight.

Since the block 10 is of aluminum or other light material which is a relatively soft metal it is necessary to provide a harder metal for carrying the screws 20 and 21. This is secured by providing steel sleeves 27 which are screw-threaded in threaded sockets in the aluminum block 10 and the screws 20 and 21 are threaded into these steel sleeves. This provides necessary wear to the block 10 so that it carries operating screws 20 and 21 without adding considerably to the weight of the tool. From the foregoing description it will be seen that I have provided a tooth shaper which is much lighter than that shown in the patent referred to and in which friction is eliminated to a much greater extent than in the former construction.

It will be obvious to those skilled in the art that various changes may be made in my device without departing from the spirit of the invention and therefore I do not limit myself to what is shown in the drawing and described in the specification, but only as indicated in the appended claim.

Having thus fully described by said invention, what I claim as new and desire to secure by Letters Patent, is:

A saw tooth shaper comprising a body portion having a pair of shaper jaws pivotally mounted therein and movable relative to each other, a pair of oppositely threaded screws having bearings on their inner ends engaging the said shaper jaws, an operating handle for such screws for moving the shaper jaws toward and from each other, the said screws being carried in hardened bushings positioned in aligned sockets in the body portion, said threaded bushings being removable and providing means for holding the screw threaded elements whereby the body portion itself may be made of lighter softer material, substantially as set forth.

In witness whereof, I have hereunto set my hand at Indianapolis, Indiana this 15th day of April, A. D. nineteen hundred and thirty.

DEWEY E. GOMMEL.